(12) United States Patent
Wang et al.

(10) Patent No.: US 11,099,315 B1
(45) Date of Patent: Aug. 24, 2021

(54) BACKLIGHT MODULE

(71) Applicant: CHICONY ELECTRONICS CO., LTD., New Taipei (TW)

(72) Inventors: Pai-Hsiang Wang, New Taipei (TW); Hsien-Kuo Kao, New Taipei (TW); Yao-Hsuan Tsai, New Taipei (TW); Chun-Tan Wu, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/103,216

(22) Filed: Nov. 24, 2020

(30) Foreign Application Priority Data

Aug. 4, 2020 (TW) .................................. 109126394

(51) Int. Cl.
*G02B 6/00* (2006.01)
*F21V 8/00* (2006.01)

(52) U.S. Cl.
CPC ......... *G02B 6/0055* (2013.01); *G02B 6/0031* (2013.01); *G02B 6/0021* (2013.01)

(58) Field of Classification Search
CPC .... G02B 6/0013; G02B 6/0015; G02B 6/002; G02B 6/0031; G02B 6/0036; G02B 6/009; G02B 6/0091; G02B 6/0055; G02B 6/0045; G02B 6/0016; G02B 6/0021

See application file for complete search history.

(56) References Cited

U.S. PATENT DOCUMENTS

| 6,193,383 B1* | 2/2001 | Onikiri | F21V 7/0091 |
| | | | 362/23.15 |
| 2008/0101083 A1* | 5/2008 | Lee | G02B 6/0018 |
| | | | 362/610 |
| 2014/0347603 A1* | 11/2014 | Lin | G02B 6/0031 |
| | | | 362/607 |
| 2016/0231493 A1* | 8/2016 | Iordache | G02B 6/0055 |

FOREIGN PATENT DOCUMENTS

| CN | 1635461 A | 7/2005 |
| TW | M32552 U | 11/2007 |

* cited by examiner

*Primary Examiner* — Y M. Quach Lee
(74) *Attorney, Agent, or Firm* — Muncy, Geissler, Olds & Lowe, P.C.

(57) ABSTRACT

The present disclosure discloses a backlight module, which includes a light guide plate and at least one light emitting unit. The light guide plate includes a first side and a second side opposite to each other, at least one accommodating portion and at least one light guide structure. The accommodating portion is adjacent to the first side and has an incident surface faced toward the second side. The light guide structure is disposed between the accommodating portion and the second side, and the light guide structure further comprises a first reflective surface and a second reflective surface. The first reflective surface is toward the first side and close to the accommodating portion. The second reflective surface is adjacent to the first reflective surface, and the second reflective surface is toward the first side and away from the accommodating portion. The light emitting unit is disposed in the accommodating portion.

7 Claims, 5 Drawing Sheets

BACKLIGHT MODULE

BACKGROUND

1. Technical Field

The present disclosure relates to a backlight module; more particularly, the present disclosure relates to a backlight module for use in a light emitting keyboard.

2. Description of the Related Art

Nowadays, with the rapid development of electronic technology and information industries, lightweight and compact size have become the trends for all kinds of electronic devices. For example, computers, laptops, tablet computers and smart phones have now become indispensable electronic devices in modern daily life or at work. In most circumstances, the user would utilize an input device, such as a mouse or a keyboard, to operate the electronic device, wherein the keyboard is most common among the input devices.

In order to make the symbol printed on each key visible and clear in an environment with insufficient light, light source technology is introduced into keyboards by means of disposing a backlight module on the bottom of a keyboard module. Generally, the backlight module includes components such as a light emitting module and a light guide plate. The light emitting module has a plurality of light emitting units; and the light guide plate has a plurality of accommodating portions, correspondingly. The light emitting units are disposed in the accommodating portions respectively, such that the light beam emitted from the light emitting units can be guided to the entire bottom of the keyboard via the light guide plate, so as to project the light beam onto each key. The light beam would go through the key surface or its periphery, so that the user can clearly see the character or symbol printed on the key cap.

Because the cost of the light emitting module is relatively high, it is common to collectively dispose the light emitting units on one side of the light guide plate, and to make the light emitting direction of the light emitting units face toward other sides, so as to achieve the effect of both cost saving and even light distribution. However, the shortcoming of such arrangement/design is that the back side (i.e. the opposite side of the light emitting direction) of the light emitting units would become a dark zone, which needs further improvement. Therefore, there is a need to provide a backlight module to mitigate and/or obviate the aforementioned problems.

SUMMARY

It is an object of the present disclosure to provide a backlight module, which adopts a novel design to a light guide structure of a light guide plate, so as to resolve the problem that the back side of a light emitting unit usually forms a dark zone while applying a conventional backlight module to a light emitting keyboard.

To achieve the abovementioned object, the present disclosure discloses a backlight module, which comprises a light guide plate and a light emitting module. The light guide plate includes a first side and a second side opposite to each other, at least one accommodating portion, and at least one light guide structure. The accommodating portion is located adjacent to the first side and has an incident surface. The incident surface faces toward the second side. The light guide structure is disposed between the accommodating portion and the second side. Further, the light guide structure includes a first reflective surface and a second reflective surface. The first reflective surface faces toward the first side and is located close to the accommodating portion. The second reflective surface is disposed adjacent to the first reflective surface, and the second reflective surface faces toward the first side and is located away from the accommodating portion. The light emitting module includes at least one light emitting unit. The light emitting unit is disposed in the accommodating portion. A light beam emitted from the light emitting unit enters into the light guide plate via the incident surface and is transmitted toward the second side, a portion of the light beam is guided to the second reflective surface by the first reflective surface, and is further guided to the first side by the second reflective surface.

According to one embodiment of the present disclosure, the light guide structure comprises an opening or a groove.

According to one embodiment of the present disclosure, the first reflective surface and the second reflective surface form a predetermined angle, wherein the predetermined angle is greater than or equal to two times of a total reflection critical angle.

According to one embodiment of the present disclosure, the first reflective surface and the second reflective surface are two connected planes.

According to one embodiment of the present disclosure, the extension directions of the first reflective surface and the second reflective surface form a predetermined angle, wherein the predetermined angle is greater than or equal to two times of a total reflection critical angle.

According to one embodiment of the present disclosure, the first reflective surface and the second reflective surface are two disconnected planes.

According to one embodiment of the present disclosure, the light guide plate is made of polycarbonate or poly (methyl methacrylate) materials, and the predetermined angle is greater than or equal to 84 degrees.

According to one embodiment of the present disclosure, the predetermined angle is less than 180 degrees.

According to one embodiment of the present disclosure, the first reflective surface and the second reflective surface jointly form a connected or disconnected arc surface.

According to one embodiment of the present disclosure, the arc measure of the arc surface is less than 180 degrees.

As described above, in a light emitting keyboard adopting the present disclosure, its light guide plate comprises a light guide structure. The light guide structure includes a first reflective surface and a second reflective surface facing toward a light emitting unit (which is disposed in an accommodating portion). The second reflective surface is disposed adjacent to the first reflective surface. The first reflective surface is located close to the accommodating portion, and the second reflective surface is located away from the accommodating portion. After a light beam emitted from the light emitting unit enters into the light guide plate via the incident surface of the accommodating portion, a portion of the light beam can be guided to the second reflective surface by the first reflective surface, and can be further guided to a first side by the second reflective surface, thereby achieving the object of eliminating the dark zone formed in the back side of the light emitting unit.

Other objects, advantages, and novel features of the disclosure will become more apparent from the following detailed description when taken in conjunction with the accompanying drawings.

BRIEF DESCRIPTION OF THE DRAWINGS

These and other objects and advantages of the present disclosure will become apparent from the following description of the accompanying drawings, which disclose several embodiments of the present disclosure. It is to be understood that the drawings are to be used for purposes of illustration only, and not as a definition of the disclosure.

In the drawings, wherein similar reference numerals denote similar elements throughout the several views.

DETAILED DESCRIPTION OF THE PREFERRED EMBODIMENT

Figure 1:
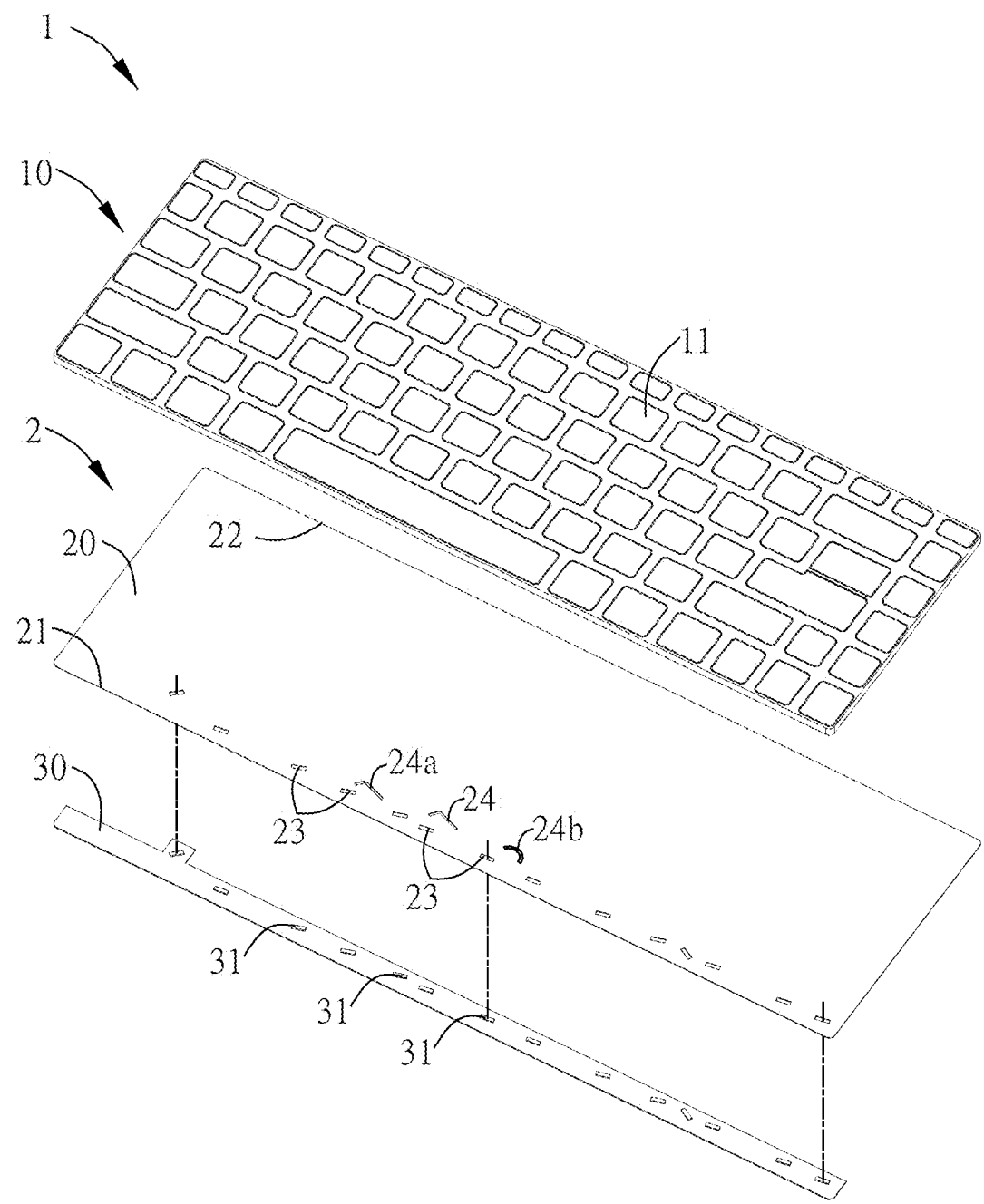
FIG. 1 illustrates an exploded view of a backlight module being applied to a light emitting keyboard according to one embodiment of the present disclosure.
Figure 2:
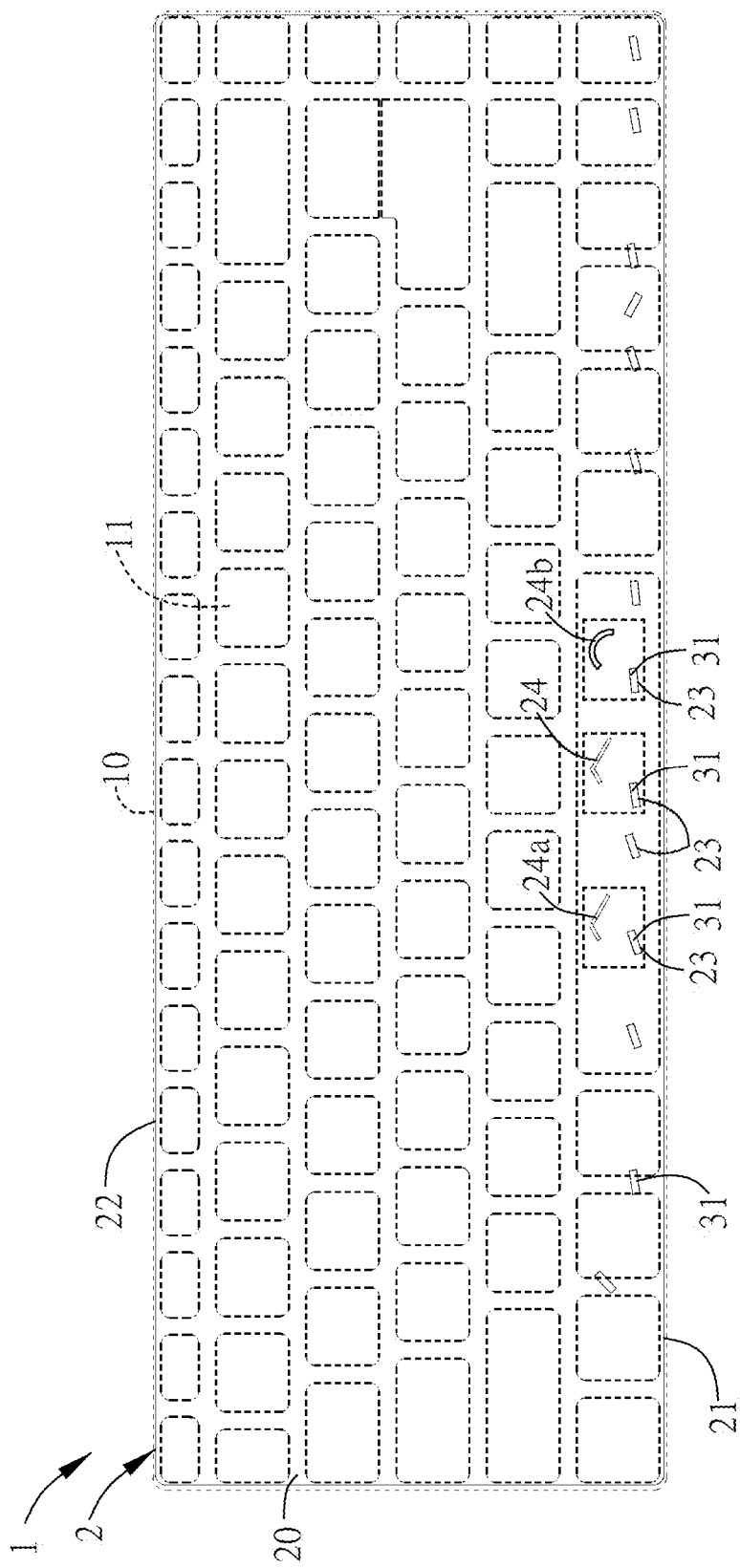
FIG. 2 illustrates a top view of the keyboard module and the backlight module as shown in FIG. 1 being assembled.

FIG. 1 illustrates an exploded view of a backlight module being applied in a light emitting keyboard according to one embodiment of the present disclosure. FIG. 2 illustrates a top view of the keyboard module and the backlight module as shown in FIG. 1 being assembled, and the keyboard module as shown in FIG. 2 is illustrated in dotted lines. Please refer to both FIG. 1 and FIG. 2, in this embodiment, a light emitting keyboard 1 comprises a keyboard module 10 and a backlight module 2. The backlight module 2 is disposed under the keyboard module 10. Specifically, the keyboard module 10 comprises a plurality of keys 11, and the backlight module 2 is located on one side opposite to the keys 11 (as shown in FIG. 1). The backlight module 2 in this embodiment comprises a light guide plate 20 and a light emitting module 30. The light emitting module 30 includes at least one light emitting unit 31. Please note that in this embodiment, the light emitting module 30 includes a plurality of light emitting units 31.

In this embodiment, the light guide plate 20 includes a first side 21 and a second side 22 opposite to each other, at least one accommodating portion 23, and at least one light guide structure 24. The first side 21 and the second side 22 can be two long sides or two short sides of the light guide plate 20. In this embodiment, the first side 21 and the second side 22 are the two long sides of the light guide plate 20 as an example. In this embodiment, the first side 21 is the long side close to the spacebar of the keyboard module 10, and the second side 22 is the long side close to the function keys of the keyboard module 10. The accommodating portion 23 is used for accommodating the light emitting unit 31. In this embodiment, the accommodating portion 23 is, but not limited to, a through hole structure provided on the light guide plate 20; the accommodating portion 23 can also be a groove structure, so that the light emitting unit 31 can be placed in the through hole or the groove. As a result, the location and number of the accommodating portion 23 can be arranged corresponding to that of the light emitting unit 31. In this embodiment, the accommodating portion 23 is located adjacent to the first side 21, so that the light emitting unit 31 is also located adjacent to the first side 21. Further, the accommodating portion 23 has an incident surface 231, which faces toward the second side 22. Specifically, the incident surface 231 is the surface which guides a light beam to enter into the light guide plate 20. When the light emitting unit 31 is installed in the accommodating portion 23, the light emitting direction of the light emitting unit 31 could face toward the incident surface 231, such that the light beam emitted from the light emitting unit 31 could enter into the light guide plate 20 via the incident surface 231 and is transmitted toward the second side 22.

Figure 3A:
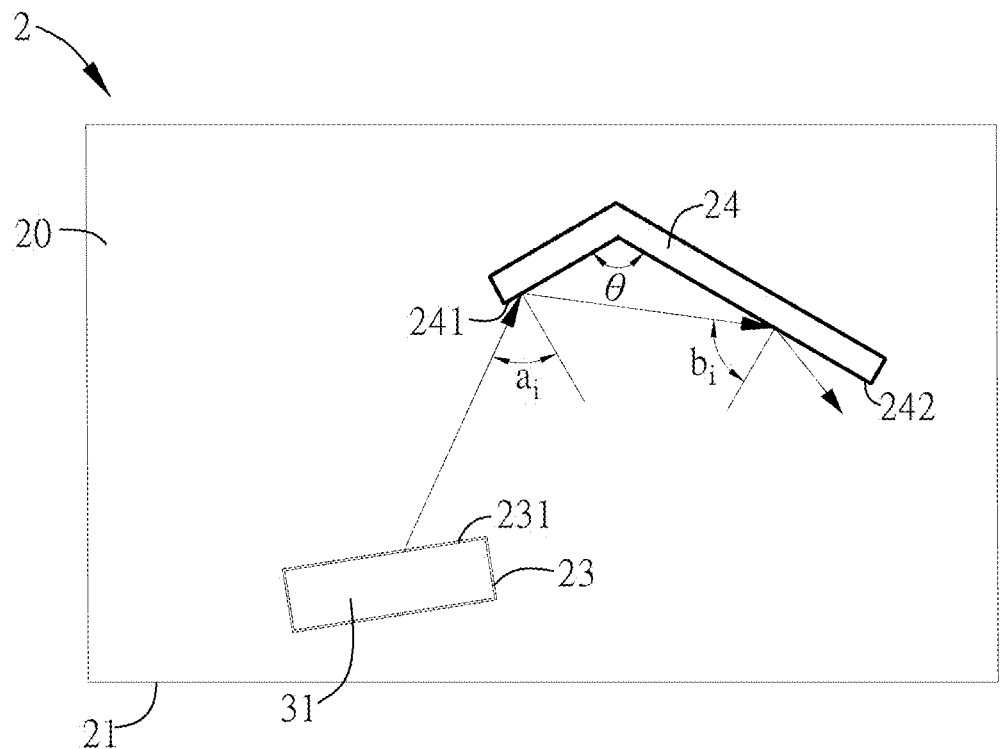
FIG. 3A illustrates an enlarged schematic drawing of one light guide structure as shown in FIG. 2.
Figure 3B:
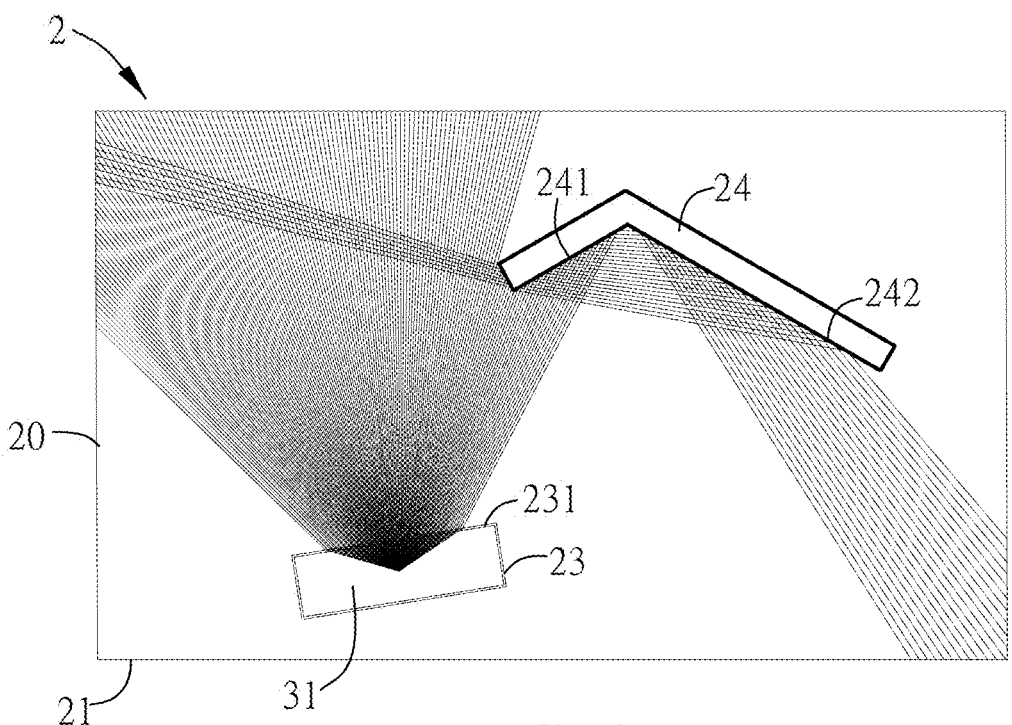
FIG. 3B illustrates a schematic drawing showing a path of a light beam emitted from a light emitting unit as shown in FIG. 3A.

The light guide plate 20 in this embodiment comprises three different types of light guide structures 24, 24a and 24b. Take the light guide structure 24 as an example for explanation first, the light guide structure 24 is disposed between the accommodating portion 23 and the second side 22. Please note that the light guide structure 24 is disposed between the accommodating portion 23 and the second side 22 by referencing the short axis direction as a basis. FIG. 3A illustrates an enlarged schematic drawing of one light guide structure 24 as shown in FIG. 2. FIG. 3B illustrates a schematic drawing showing a path of a light beam emitted from the light emitting unit as shown in FIG. 3A. Please refer to FIG. 2, FIG. 3A and FIG. 3B. The light guide structure 24 comprises a first reflective surface 241 and a second reflective surface 242. The first reflective surface 241 and the second reflective surface 242 are the surfaces located on the side of the light guide structure 24 facing toward the first side 21. The first reflective surface 241 is located close to the accommodating portion 23, such that a portion of the light beam entering from the incident surface 231 into the light guide plate 20 can be transmitted to the first reflective surface 241 (which means part of the light beam contacts the first reflective surface 241). Preferably, part of the first reflective surface 241 may correspond to the incident surface 231. That is, the first reflective surface 241 partially overlaps with part of the projection area projected from the incident surface 231 onto the first side 21, so as to further ensure that the light beam entering into the light guide plate 20 via the incident surface 231 can be transmitted to the first reflective surface 241.

Further, the second reflective surface 242 is disposed adjacent to the first reflective surface 241, and the second reflective surface 242 is located on one end of the first reflective surface 241 which is away from the accommodating portion 23, so as to receive the light beam reflected from the first reflective surface 241. In short, the light beam emitted from the light emitting unit 31 can enter into the light guide plate 20 via the incident surface 231, wherein part of the light beam would be transmitted to the first reflective surface 241, so as to be further guided to the second reflective surface 242 by the first reflective surface 241. Next, since the second reflective surface 242 faces toward the first side 21, the light beam can further be guided to the first side 21 by the second reflective surface 242, so as to eliminate the dark zone located on the back side of the light emitting unit 31.

In detail, the light guide structure 24 in this embodiment can be, but is not limited to, an opening or a groove, such that the light guide plate 20 can include both medium of higher refractive index (i.e. the light guide plate 20 itself) and medium of lower refractive index (i.e. the opening or air in the groove). Therefore, when the light beam in the light guide plate 20 (i.e. the medium of higher refractive index) is transmitted to the light guide structure 24 (i.e. the medium of lower refractive index), the interfaces (i.e. the first reflective surface 241 and the second reflective surface 242) between two types of medium would cause refraction and total reflection due to different angles of the incident light. In this embodiment, the light guide plate 20 can be made of materials such as but not limited to polycarbonate (PC) or poly(methyl methacrylate) (PMMA). In this embodiment, the light guide plate 20 is made of polycarbonate with its refractive index of 1.52. Generally, the total reflection critical angle of light being transmitted from the polycarbonate-made light guide plate 20 (i.e. the medium of higher refractive index) to the light guide structure 24 (i.e. the medium of lower refractive index) is 42 degrees. In other words, if the incident angle is greater than or equal to 42 degrees, it would cause total reflection. Therefore, when the light beam is transmitted to the first reflective surface 241 with an incident angle $a_i$ greater than or equal to 42 degrees, the light beam would be transmitted toward the second reflective surface 242 because of the first total reflection. Next, the light beam would similarly be transmitted to the second reflective surface 242 with an incident angle $b_i$ greater than or equal to 42 degrees, such that the light beam would be transmitted toward the first side 21 because of the second total reflection. In other words, in this embodiment, the path of the light beam can be dramatically changed by means of causing two times of total reflection by the light beam.

In this embodiment, the light guide structure 24 is an L-shaped opening, such that the first reflective surface 241 and the second reflective surface 242 are two connected planes. A predetermined angle θ is formed between the first reflective surface 241 and the second reflective surface 242. In the example of causing two times of total reflection, the predetermined angle θ is equal to the sum of the incident angle $a_i$ of the first reflective surface 241 and the incident angle $b_i$ of the second reflective surface 242, that is, $\theta=a_i+b_i$. Since both of the incident angles $a_i$ and $b_i$ need to be greater than or equal to the total reflection critical angle (i.e. 42 degrees in this embodiment) for total reflection, the predetermined angle θ in this embodiment can be limited to be greater than or equal to two times of the total reflection critical angle. In this embodiment, the total reflection critical angle between the light guide plate 20 and the light guide structure 24 is 42 degrees, therefore the predetermined angle θ is greater than 84 degrees. Preferably, the predetermined angle θ is less than 180 degrees.

By means of limiting the predetermined angle θ between the first reflective surface 241 and the second reflective surface 242, the light beam reflected from the first reflective surface 241 can be transmitted to the second reflective surface 242 with the incident angle $b_i$ greater than or equal to 42 degrees, so as to cause the second total reflection, and thus guiding the light beam to the first side 21 of the light guide plate 20. Because the first side 21 is located on the back side of the light emitting unit 31, two times of total reflection caused by the first reflective surface 241 and the second reflective surface 242 of the light guide structure 24 can dramatically change the path of the light beam, so that the light beam can be guided to the first side 21, and therefore the dark zone located on the back side of the light emitting unit 31 can be eliminated, as shown in FIG. 3b.

Figure 4A:
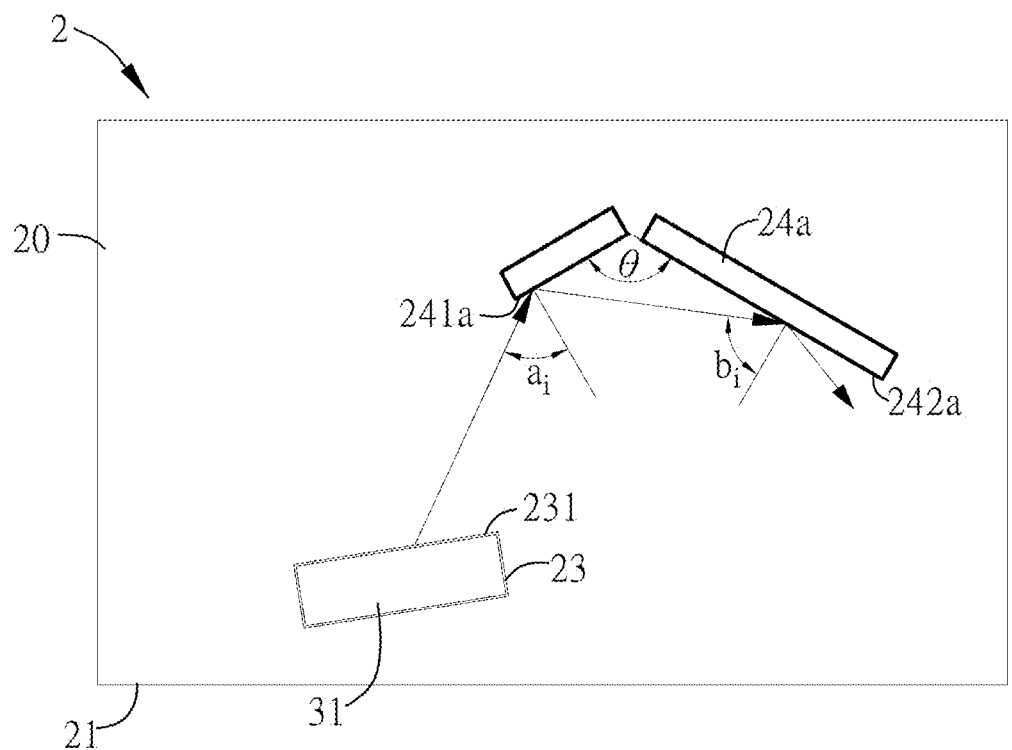
FIG. 4A illustrates an enlarged schematic drawing of another light guide structure as shown in FIG. 2.
Figure 4B:
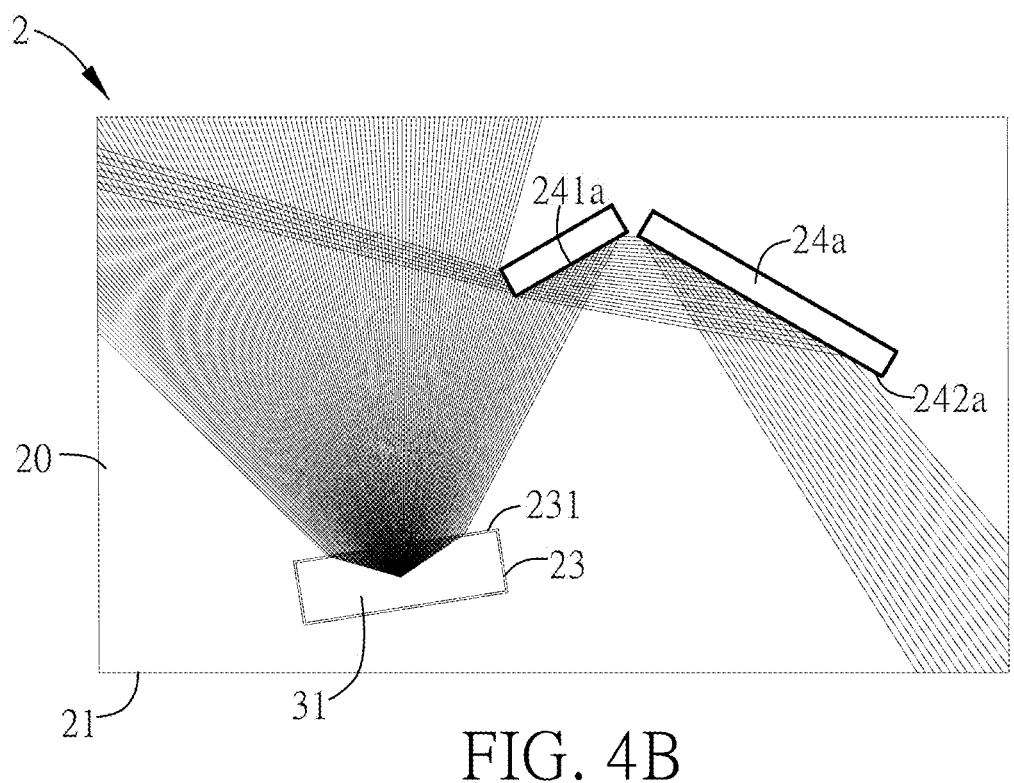
FIG. 4B illustrates a schematic drawing showing a path of a light beam emitted from a light emitting unit as shown in FIG. 4A.

FIG. 4A illustrates an enlarged schematic drawing of another light guide structure 24a as shown FIG. 2. FIG. 4B illustrates a schematic drawing showing a path of a light beam emitted from the light emitting unit as shown in FIG. 4A. Please refer to FIG. 2, FIG. 4A and FIG. 4B. In this embodiment, the light guide structure 24a is composed of two openings (slits) forming an L-shape, such that the first reflective surface 241a and the second reflective surface 242a form two disconnected planes. Similarly, the angle limitation also applies to the angle between the first reflective surface 241a and the second reflective surface 242a. In this embodiment, a predetermined angle θ is formed between extension directions of the first reflective surface 241a and the second reflective surface 242a. Likewise, the predetermined angle θ is greater than or equal to two times of the total reflection critical angle; that is, the predetermined angle θ is greater than or equal to 84 degrees. Preferably, the predetermined angle θ is also less than 180 degrees.

After the light beam enters into the light guide plate 20 via the incident surface 231, if the light beam is transmitted to the first reflective surface 241a with an incident angle $a_i$ greater than or equal to 42 degrees, it would cause first total reflection, so that the light beam would be transmitted toward the second reflective surface 242a. The light beam reflected by the first reflective surface 241a is then transmitted to the second reflective surface 242a with an incident angle $b_i$ greater than or equal to 42 degrees to cause second total reflection, so that the light beam would be guided to the first side 21 of the light guide plate 20, and thereby achieving the abovementioned effect of eliminating the dark zone located on the back side of the light emitting unit 31, as shown in FIG. 4B.

Figure 5:
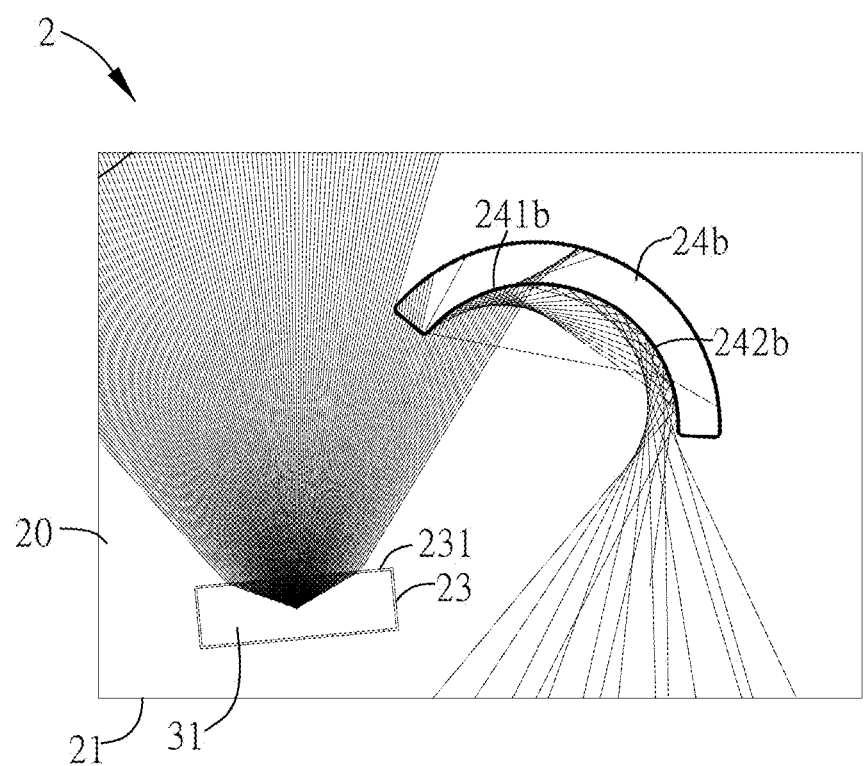
FIG. 5 illustrates an enlarged schematic drawing of yet another light guide structure as shown in FIG. 2.

FIG. 5 illustrates an enlarged schematic drawing of yet another light guide structure 24b as shown in FIG. 2. Please refer to both FIG. 2 and FIG. 5. In this embodiment, the light guide structure 24a is an arc-shaped opening, so that the first reflective surface 241b and the second reflective surface 242b would jointly form a connected arc surface. Preferably, the arc measure of the arc surface is less than 180 degrees. Because the arc shape can be treated as being composed of countless planes, the effect of causing two times of total reflection by the light beam and guiding the light beam to the first side 21 can also be achieved. In other embodiments, the light guide structure 24b can also be two arc-shaped openings, such that the first reflective surface 241b and the second reflective surface 242b would jointly form a disconnected arc surface, which can similarly achieve the effect of causing two times of total reflection by the light beam.

Specifically, the light beam enters into the light guide plate 20 via the incident surface 231 and is transmitted to the first reflective surface 241a, which is located close to the accommodating portion 23. If the incident angle $a_i$ is greater than or equal to 42 degrees, it would cause the first total reflection, so that the light beam can be further transmitted toward the second reflective surface 242b. Likewise, if the incident angle $b_i$ is greater than or equal to 42 degrees, it would cause the second total reflection, so that the light beam would be guided to the first side 21 of the light guide plate 20, and thereby achieving the abovementioned effect of eliminating the dark zone located on the back side of the light emitting unit 31.

As described above, in a light emitting keyboard adopting the present disclosure, its light guide plate comprises a light guide structure. The light guide structure includes a first reflective surface and a second reflective surface facing toward a light emitting unit (which is disposed in an accommodating portion). The second reflective surface is disposed adjacent to the first reflective surface. The first reflective surface is located close to the accommodating portion, and the second reflective surface is located away from the accommodating portion. After a light beam emitted from the light emitting unit enters into the light guide plate via the incident surface of the accommodating portion, a portion of the light beam can be guided to the second reflective surface by the first reflective surface, and can be further guided to a first side by the second reflective surface, thereby achieving the object of eliminating the dark zone formed in the back side of the light emitting unit.

Although the present disclosure has been explained in relation to its preferred embodiments, it is to be understood that many other possible modifications and variations can be made without departing from the spirit and scope of the disclosure as hereinafter claimed.

What is claimed is:

1. A backlight module, comprising:
   a light guide plate, including:
      a first side and a second side opposite to each other;
      at least one accommodating portion, located adjacent to the first side and having an incident surface, wherein the incident surface faces toward the second side; and
      at least one light guide structure, disposed between the accommodating portion and the second side, and the light guide structure including:
         a first reflective surface, facing toward the first side and located close to the accommodating portion; and
         a second reflective surface, disposed adjacent to the first reflective surface, and the second reflective surface facing toward the first side and located away from the accommodating portion, wherein the first reflective surface and the second reflective surface form a predetermined angle, wherein the predetermined angle is greater than or equal to two times of a total reflection critical angle; and
   a light emitting module, including at least one light emitting unit, wherein the light emitting unit is disposed in the accommodating portion, a light beam emitted from the light emitting unit enters into the light guide plate via the incident surface and is transmitted toward the second side, a portion of the light beam is guided to the second reflective surface by the first reflective surface, and is further guided to the first side by the second reflective surface.

2. The backlight module as claimed in claim 1, wherein the light guide structure comprises an opening or a groove.

3. The backlight module as claimed in claim 1, wherein the first reflective surface and the second reflective surface are two connected planes.

4. The backlight module as claimed in claim 1, wherein the light guide plate is made of polycarbonate or poly (methyl methacrylate) materials, and the predetermined angle is greater than or equal to 84 degrees.

5. A backlight module, comprising:
   a light guide plate, including:
      a first side and a second side opposite to each other;
      at least one accommodating portion, located adjacent to the first side and having an incident surface, wherein the incident surface faces toward the second side; and
      at least one light guide structure, disposed between the accommodating portion and the second side, and the light guide structure including:
         a first reflective surface, facing toward the first side and located close to the accommodating portion; and
         a second reflective surface, disposed adjacent to the first reflective surface, and the second reflective surface facing toward the first side and located away from the accommodating portion, wherein the first reflective surface and the second reflective surface jointly form a connected or disconnected arc surface, and
   a light emitting module, including at least one light emitting unit, wherein the light emitting unit is disposed in the accommodating portion, a light beam emitted from the light emitting unit enters into the light guide plate via the incident surface and is transmitted toward the second side, a portion of the light beam is guided to the second reflective surface by the first reflective surface, and is further guided to the first side by the second reflective surface.

6. The backlight module as claimed in claim 5, wherein the arc measure of the arc surface is less than 180 degrees.

7. The backlight module as claimed in claim 5, the light guide structure comprises an opening or a groove.

* * * * *